(12) United States Patent
Swar et al.

(10) Patent No.: US 9,341,537 B2
(45) Date of Patent: May 17, 2016

(54) SYSTEM, METHOD, AND APPARATUS FOR CERTIFYING A BRAKE PRESSURE CALIBRATION FOR AN END-OF-TRAIN DEVICE

(71) Applicant: Wabtec Holding Corp., Wilmerding, PA (US)

(72) Inventors: Padam D. Swar, Clarksburg, MD (US); Brian E. Kurz, Germantown, MD (US)

(73) Assignee: Wabtec Holding Corp., Wilmerding, PA (US)

( * ) Notice: Subject to any disclaimer, the term of this patent is extended or adjusted under 35 U.S.C. 154(b) by 474 days.

(21) Appl. No.: 13/796,301

(22) Filed: Mar. 12, 2013

(65) Prior Publication Data
US 2014/0260518 A1    Sep. 18, 2014

(51) Int. Cl.
B60T 17/22    (2006.01)
G01L 27/00    (2006.01)

(52) U.S. Cl.
CPC ................................. G01L 27/005 (2013.01)

(58) Field of Classification Search
None
See application file for complete search history.

(56) References Cited

U.S. PATENT DOCUMENTS

| | | | |
|---|---|---|---|
| 4,123,115 A * | 10/1978 | King | B60T 8/1818 188/195 |
| 4,361,825 A | 11/1982 | Shockley | |
| 4,794,548 A | 12/1988 | Lynch et al. | |
| 4,817,019 A * | 3/1989 | Morihara | 702/188 |
| 4,847,770 A * | 7/1989 | Kane et al. | 701/20 |
| 5,377,938 A | 1/1995 | Bezos et al. | |
| 5,383,717 A | 1/1995 | Fernandez et al. | |
| 5,621,657 A | 4/1997 | Ferri | |
| 5,808,909 A | 9/1998 | Rees | |
| 5,817,934 A | 10/1998 | Skantar | |
| 5,963,883 A | 10/1999 | Cunkelman et al. | |
| 6,095,618 A | 8/2000 | Heneka et al. | |
| 6,182,001 B1 | 1/2001 | Sugai et al. | |
| 7,054,777 B2 | 5/2006 | Crane et al. | |
| 7,089,815 B2 | 8/2006 | Fogelstrom | |
| 7,841,672 B2 | 11/2010 | Teifke et al. | |
| 8,224,591 B2 | 7/2012 | Smith et al. | |
| 2004/0260486 A1 | 12/2004 | Buschmann et al. | |
| 2006/0015224 A1 * | 1/2006 | Hilleary | 701/19 |
| 2006/0074581 A1 | 4/2006 | Crane et al. | |
| 2010/0109426 A1 * | 5/2010 | Fugiel et al. | 303/3 |
| 2011/0015876 A1 | 1/2011 | Smith et al. | |
| 2011/0154893 A1 | 6/2011 | Fugiel et al. | |
| 2012/0166109 A1 | 6/2012 | Kernwein et al. | |

* cited by examiner

Primary Examiner — Robert R Raevis
(74) Attorney, Agent, or Firm — The Webb Law Firm

(57) ABSTRACT

A system, method, and apparatus for certifying an end-of-train device pressure calibration is provided. The system includes a pressure calibration device configured to output a regulated pressure; and an end-of-train device comprising: a brake pipe interface adapted to receive the regulated pressure from the pressure calibration device; and a pressure sensing device configured to obtain a measured pressure by measuring the regulated pressure. At least one of the pressure calibration device and the end-of-train device comprises at least one controller configured to determine a calibration certification result based at least partially on a difference between the measured pressure and the regulated pressure.

19 Claims, 4 Drawing Sheets

SYSTEM, METHOD, AND APPARATUS FOR CERTIFYING A BRAKE PRESSURE CALIBRATION FOR AN END-OF-TRAIN DEVICE

BACKGROUND OF THE INVENTION

1. Field of the Invention

The present invention relates to brake pressure calibration and, in particular, a system, method, and apparatus for certifying a brake pressure calibration of an end-of-train device.

2. Description of Related Art

Typically, end-of-train (EOT) devices are required to report the brake pipe pressure of a train within a specified accuracy. The accuracy of the pressure transducer or other sensing device in an EOT device may be mandated by a government agency or entity such as the Federal Railroad Administration (FRA). Under FRA regulations, the accuracy of EOT device pressure measurements must be verified annually.

Traditionally, determining the accuracy of an EOT device pressure transducer is a manual process that is part of an FRA annual inspection. The inspection occurs on-site and requires the presence of FRA agents. The manual nature of such testing and inspection allows for operator or inspector error, and may be untrustworthy. For example, operators may conclude that an EOT device is accurate or "close enough" without using a bright-line determination. Further, the use of forms and manual recordation does not allow for an EOT transducer accuracy to be certified without an FRA inspector or other authority present.

SUMMARY OF THE INVENTION

Generally, it is an object of the present invention to provide a system, method, and apparatus for certifying a pressure calibration for an end-of-train device that overcomes some or all of the deficiencies of the prior art.

According to one preferred and non-limiting embodiment, provided is a system for certifying an end-of-train device pressure calibration, comprising: a pressure calibration device configured to output a regulated air pressure; and an end-of-train device comprising: a brake pipe interface adapted to receive the regulated pressure from the air calibration device; and a pressure measurement device programmed, configured, or adapted to obtain a measured pressure by measuring the regulated air pressure; wherein at least one of the pressure calibration device and the end-of-train device comprises at least one controller configured to determine a calibration certification result based at least partially on a difference between the measured pressure and the regulated pressure.

A system for certifying an end-of-train device pressure calibration, comprising: (a) a pressure calibration device programmed, configured, or adapted to output a regulated pressure; and (b) an end-of-train device comprising: (i) a brake pipe interface adapted to receive the regulated pressure from the pressure calibration device; and (ii) a pressure sensing device configured to obtain a measured pressure by measuring the regulated pressure, wherein at least one of the pressure calibration device and the end-of-train device comprises at least one controller programmed, configured, or adapted to determine a calibration certification result based at least partially on a difference between the measured pressure and the regulated pressure.

According to another preferred and non-limiting embodiment, provided is a method for certifying an end-of-train device pressure calibration, comprising: applying a fixed pressure to a brake pipe interface of the end-of-train device; measuring the fixed pressure with the end-of-train device to determine a measured pressure; determining if the measured pressure is within a predetermined range of the fixed pressure; generating pressure calibration certification data based at least partially on whether the measured pressure is within the predetermined range of the fixed pressure; and transmitting the pressure calibration certification data to at least one remote server.

According to a further preferred and non-limiting embodiment, provided is a computer program product for certifying an end-of-train device pressure calibration on a mobile device including at least one processor, the computer program product comprising at least one non-transitory computer-readable medium including program instructions that, when executed by the at least one processor, cause the mobile device to: determine or receive an identification of the end-of-train device at least partially based on at least one of the following: scanning at least one visible indicia comprising identification data, receiving identification data from an input device, receiving a selection of an end-of-train device, receiving identifying data from an RFID transponder, receiving identifying data from a near-field communication device, or any combination thereof; determine or receive a pressure calibration certification result based at least partially on a fixed pressure applied to the end-of-train device and a measurement of the fixed pressure by the end-of-train device; and transmit, to at least one remote server, the identification of the end-of-train device and the pressure calibration certification result.

According to another preferred and non-limiting embodiment, provided is an end-of-train device for certifying a brake pressure calibration, comprising: (a) a brake pipe interface adapted to receive a regulated air pressure; (b) at least one pressure transducer programmed, configured, or adapted to measure the regulated air pressure; and (c) at least one controller in communication with the at least one pressure transducer, the at least one controller programmed, configured, or adapted to: (i) determine a variance between the regulated air pressure and a pressure measured by the at least one pressure transducer; (ii) determine a pressure calibration certification result based at least partially on the variance; and (iii) transmit, or cause another device to transmit, the pressure calibration certification result to at least one remote server.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
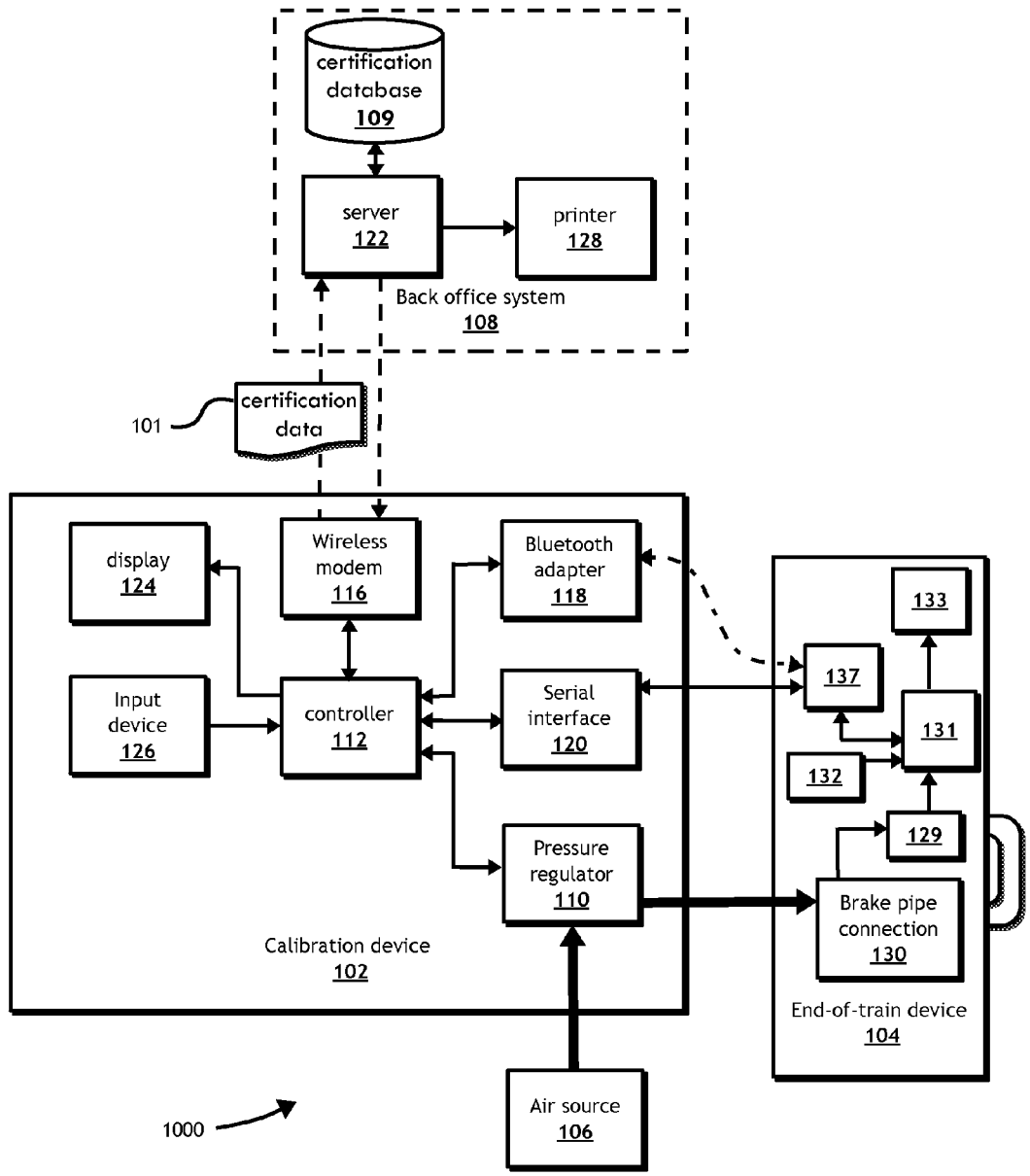
FIG. 1 illustrates a schematic diagram of one embodiment of a system for certifying a brake pressure calibration for an end-of-train device according to the principles of the present invention.

For purposes of the description hereinafter, the teens "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous arrangements are possible. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM) Code Division Multiple Access (CDMA), Long-Term Evolution (LTE), Worldwide Interoperability for Microwave Access (WiMAX), etc.), and/or the like.

In a preferred and non-limiting of the present invention, provided is a system, method, and apparatus for certifying a brake pressure calibration for an EOT device that includes a calibration device, or other regulated pressure source, and an EOT device including programmed software and/or firmware. The EOT device measures a regulated pressure output by the calibration device and compares the measured pressure to the amount of pressure actually output. The EOT device, including the EOT pressure transducer, is certified to be properly calibrated and accurate if the measured pressure is within a predefined range from the regulated output pressure. The EOT device and/or the calibration device then transmits a certification result or other certification data to a remote server such as, but not limited to, a back office system, a governmental agency server, a central dispatch authority, and/or the like. The certification result indicates whether the EOT device has passed or failed certification.

Referring now to FIG. 1, and according to a preferred and non-limiting embodiment, a system 1000 for certifying a brake pressure calibration for an EOT device 104 is shown. The system 1000 includes a calibration device 102, an EOT device 104, an air source 106, and a back office system 108. The calibration device 102 includes a pressure regulator 110 adapted to receive pressurized air from the air source 106 and to regulate the pressure according to a predetermined setting. It will be appreciated that, in addition to certifying an EOT device 104 with air pressure, the system 1000 may also be used with hydraulic/fluidic brake systems, and use a fluid source and fluid pressure regulator.

Still referring to FIG. 1, a controller 112 of the calibration device 102 is in communication with a pressure regulator 110, an input device 126, a display device 124, a wireless communications device 116, a Bluetooth adapter 118, and a serial interface 120. It will be appreciated that various other components and equivalents may be used and that, in some non-limiting embodiments, the calibration device 102 may have less, more, or different components than shown in FIG. 1.

With continued reference to FIG. 1, the wireless communications device 116 may include, but is not limited to, any device or system configured for communication with a remote server 122 and/or the EOT device 104 such as, for example, a cellular module or device, a wireless network adapter that is configured to use a wireless internet or local area network (LAN) connection, a mobile phone, and/or the like. The display device 124 may include one or more display units configured to display characters, text, images, and/or the like, or one or more display adapters configured to communicate with external display units. The input device 126 may include a keyboard, a number pad, one or more buttons, a touch screen device, and/or an adapter configured to communicate with external input devices.

Still referring to FIG. 1, the EOT device 104 may include various components such as, but not limited to, a brake pipe interface 130 adapted to be connected to a brake pipe system of a train and the calibration device 102, a pressure transducer 129, an EOT controller 131, a display device 133, and a communications interface 137. The communication interface 137 may include a serial interface, a wireless communication device (e.g., a wireless model, Bluetooth adapter, and the like), and/or other devices for communicating data. The pressure transducer 129, communication interface 137, and display device 133 may be in communication with the EOT controller 131. The pressure transducer 129 may include any pressure sensing device capable of sensing and/or measuring gas or fluid pressure such as, but not limited to, piezoresistive strain gauges, capacitive sensors, piezoelectric sensors, optical sensors, potentiometric sensors, resonant sensors, electromagnetic sensors, and/or the like. The communication interface 137 may be configured to communicate with the serial interface 120 or Bluetooth adapter 118 of the calibration device 102. It will be appreciated that the EOT device 104 and calibration device 102 may communicate and exchange data in various other ways.

In one preferred and non-limiting embodiment, and with continued reference to FIG. 1, a back office system 108 includes a remote server 122, a certification database 109, and a certification printer 128. It will be appreciated that the remote server 122 may be in any location and under the control of any entity such as, for example, a governmental agency, a railroad company, a third-party, and/or the like. The remote server 122 includes one or more processors and is programmed, configured, or adapted to receive a pressure calibration certification result from the calibration device 102 and/or EOT device 104. In the example shown in FIG. 1, the remote server 122 is in communication with the wireless communications device 116 (e.g., wireless modem) of the calibration device 102.

The certification printer 128 may be configured to print labels indicating whether the EOT device 104 has passed or failed certification. It will be appreciated that the certification printer 128 may also be located anywhere, and does not necessarily need to be proximate to the remote server 122 and/or the back office system 108. For example, the certification printer 128 may be located in a testing station, a repair center, a train yard, and/or the like, and be in communication with the remote server 122, calibration device 102, and/or the EOT device 104. If no certification printer 128 is available, the display 124 on the calibration device 102 may indicate that a label needs to be manually printed. Further, the certification database 109 may include one or more data structures that store pressure calibration certification data 101 for one or more EOT devices 104. The certification database 109 may also be located anywhere, and may be in communication with the server 122, the calibration device 102, and/or the EOT device 104. In the non-limiting example shown in FIG. 1, the remote server 122 stores the certification data 101 received from the calibration device 102 in the certification database 109.

Still referring to FIG. 1, in a preferred and non-limiting embodiment, the EOT device may have various modes or states for testing, operation, and/or the like. A testing mode or state may include a calibration certification mode or state in which the EOT device 104, and particularly the pressure transducer 129, is configured to receive a regulated air pressure through the brake pipe interface 130. In one example of operation, the EOT device 104 is removed from a train and taken to a testing station, train yard, repair center, and/or the like. The EOT device 104 is then placed in calibration certification mode or state by actuation or manipulation of a button or other input device 132 on the EOT device 104, or through a command received from the back office system 108, remote server 122, and/or the calibration device 102.

Once the calibration device 102 and EOT device 104 have been connected, and the EOT device 104 is in a calibration certification mode or state, a fixed, regulated pressure is applied to the brake pipe interface 130 by the calibration device 102. The pressure transducer 129 of the EOT device 104 measures the amount of pressure and communicates the measurement data to the EOT controller 131. In a non-limiting embodiment, the calibration device 102 detects the connection of the EOT device 104 and initiates the calibration operation (i.e., regulated output pressure) upon detection. The EOT controller 131 may also receive data representing the actual pressure being applied (i.e., the pressure actually output by the pressure regulator) from, for example, the calibration device 102 or another source through the communication interface 137.

After measuring the regulated pressure, the EOT controller 131 compares the measured pressure received from the pressure transducer 129 to the actual pressure being applied to the EOT device 104, and generates pressure calibration certification data 101 based at least partially on the comparison. For example, if the pressure transducer 129 produces a measurement that is within a predetermined range, percentage difference, or variance of the regulated pressure amount (e.g., +/−3 psi), the pressure calibration certification data 101 includes a certification result indicating that the EOT device 104 passed certification. Conversely, if the pressure transducer 129 produces a measurement that is outside the predetermined range, percentage difference, or variance of the regulated pressure amount, the certification result will indicate that the EOT device 104 failed certification.

In a preferred and non-limiting embodiment, the pressure calibration certification data 101 may include, in addition to the certification result, the regulated pressure amount, the measured pressure from the pressure transducer 129, a date and/or time of the calibration certification, an identifier of the EOT device 104, an identifier of the calibration device 102, an identification of one or more individuals conducting the calibration certification, a testing or inspection location, an actual variance, a percentage variance, ranges that indicate severity or lead to other specific actions, and/or other like parameters and details. The pressure calibration certification data 101 may be packetized for a particular communication protocol, or may be in the form of any data structure such as, but not limited to, an array, vector, record or table, database, and/or the like.

Still referring to FIG. 1, it will be appreciated that various actions and/or inputs may be used to initiate the pressure calibration certification of the EOT device 104, or to place the EOT device 104 in a pressure calibration certification mode or state. For example, in one preferred and non-limiting embodiment, an input device 132 of the EOT device 104, such as one or more buttons, touch screens, or the like, is used to initiate the process. In this example, an operator of the system 1000 will apply a predefined and regulated pressure to the brake pipe interface 130 of the EOT device 104 while the EOT device 104 is not in motion and is removed from the train. The operator will then actuate or manipulate the input device 132 until the display device 133 indicates that the EOT device 104 is in a calibration certification mode or state. For example, the display device 104 may show the letters "CERT" to indicate this mode or state. The operator will then actuate or manipulate the input device 132 to begin the certification process. After the EOT device 104 measures the regulated pressure and compares the measured pressure to the fixed pressure amount received via the communication interface 137 or from elsewhere, the display device 133 indicates the certification result (e.g., "PASS" or "FAIL"), and generates pressure calibration certification data 101 including the certification result. The pressure calibration certification data 101 is then transmitted by the EOT device 104 or the calibration device 102 to the remote server 122.

In another preferred and non-limiting embodiment, and with continued reference to FIG. 1, a menu on the display device 133 is used to initiate the calibration certification process. For example, an operator of the system 1000 may use the input device 132 to cycle through an operational feature menu and select a pressure calibration certification mode or state. The display device 133 may then display the current pressure being measured by the pressure transducer 129. The input device 132 may then be used to increment the displayed pressure amount (e.g., in 1 psi increments or other units) until the display device 133 shows the actual regulated pressure amount being applied to the brake pipe interface 130. When the actual pressure being applied is displayed, the operator will then wait a predetermined amount of time (e.g., fifteen seconds) and use the input device 132 to initiate the calibration certification process. At this point, the EOT controller 131 compares the currently displayed pressure amount with the measured pressure to determine if the EOT device 104 passes or fails the certification. The display device 133 may then indicate the certification result (e.g., "PASS" or "FAIL"), and the EOT controller 131 generates pressure calibration certification data 101 including the result. As already described, the pressure calibration certification data 101 may be transmitted by the EOT device 104 or the calibration device 102 to the remote server 122.

Figure 2:
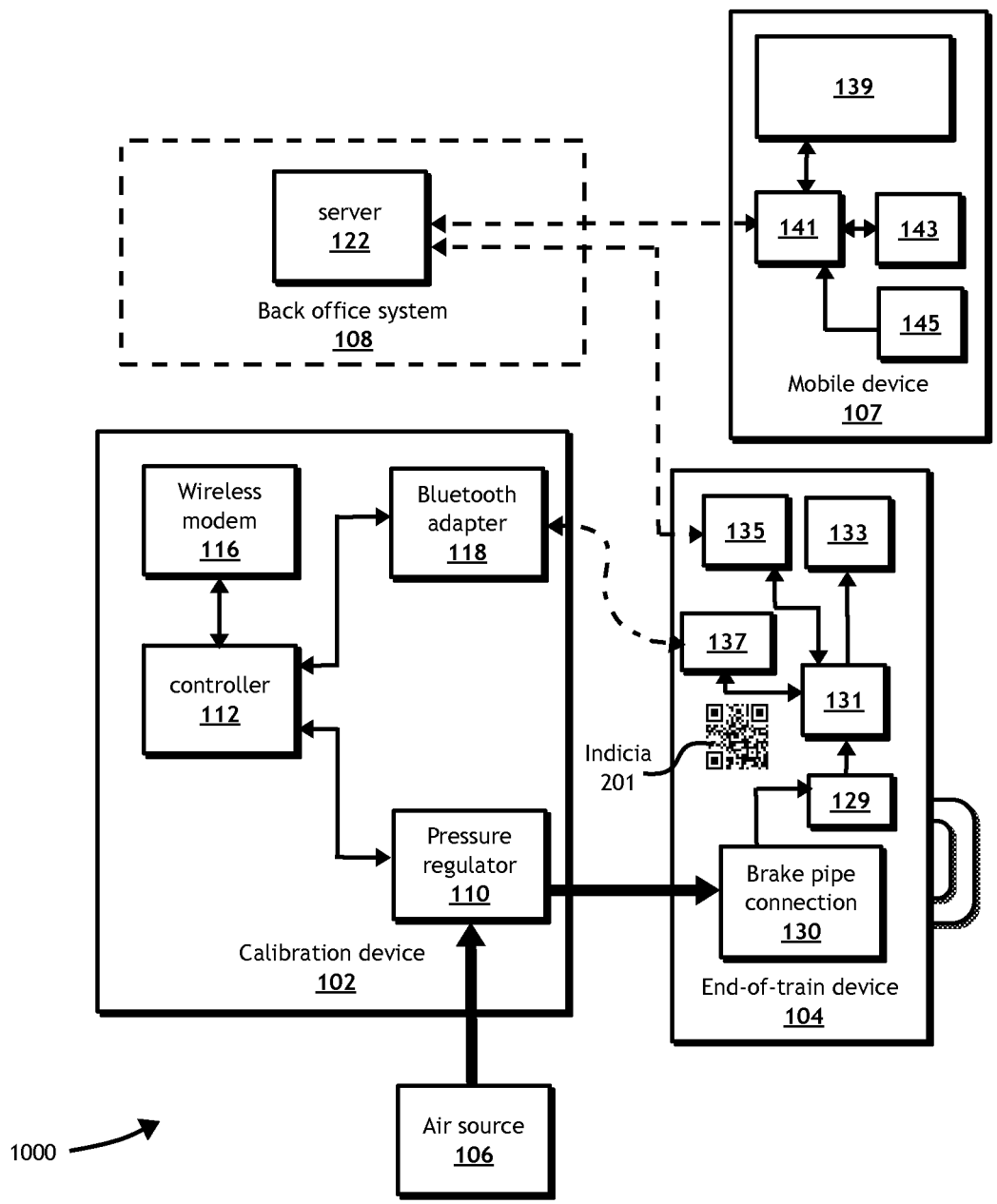
FIG. 2 illustrates a schematic diagram of another embodiment of a system for certifying a brake pressure calibration for an end-of-train device according to the principles of the present invention.

Referring now to FIG. 2, a preferred and non-limiting embodiment is shown of a system 1000 for certifying brake pressure calibration for an EOT device 104. In the embodiment depicted in FIG. 2, the EOT device 104 includes a wireless communications device 135, such as a cellular module or device, a wireless network adapter that is configured to use a wireless internet or local area network (LAN) connection, a mobile phone connection, and/or the like. The wireless communications device 135 is configured to communicate with a remote server 122, the calibration device 102, and/or a mobile device 107. The EOT device 104 may also comprise visual indicia 201 that includes or contains identification data for the EOT device 104. The indicia 201 may include, but is not limited to, a matrix barcode (e.g., a QR code or other two-dimensional barcode), a standard one-dimensional barcode, visual text capable of being imaged and processed, and/or the like.

With continued reference to FIG. 2, and in a preferred and non-limiting embodiment, the mobile device 107 may include, but is not limited to, a mobile phone, a laptop computer, a tablet computer, a Personal Digital Assistant (PDA), and/or any other portable device capable of performing data processing functions and communicating with other devices. For example, the mobile device 107 may include a general purpose smart phone capable of running software applications. The mobile device 107 is configured with software and/or hardware to communicate with the remote server 122, the EOT device 104, and/or the calibration device 102. Thus, in various arrangements, the mobile device 107 may be used to initiate and/or implement the calibration certification process. The mobile device 107 includes a controller 141, such a central processing unit (CPU), a display device 139, a camera unit 145, and memory 143. The display device 139, in some embodiments, may be a touch screen that also servers as an input device. However, it will be appreciated that other input devices may be used with the mobile device 107.

In a preferred and non-limiting embodiment, and with continued reference to FIG. 2, the operator of the system 1000 will apply a fixed, regulated pressure to the brake pipe interface 130 of the EOT device using the calibration device 102 or some other regulated pressure source. The mobile device 107 is configured to prompt the operator, through the display device 133, to input an identification of the EOT device 104. For example, the camera unit 145 may be used to scan and/or image the indicia 201 on the EOT device 104, such that the controller 141 can determine or extract identification data for the EOT device 104. If the indicia 201 comprises text, the mobile device 107 may use one or more text recognition algorithms to determine the identification of the EOT device 104. If the indicia 201 comprises a barcode, the mobile device 107 may extract the identification of the EOT device 104 using an algorithm that corresponds to the type of barcode. It will be appreciated that the identification of the EOT device 104 may also be manually input into the mobile device 104 by the operator, received from a remote connection, selected from a menu, and/or the like.

Once the mobile device 107 has identified the EOT device 104, the mobile device 107 may prompt the operator to input the regulated pressure being applied to the EOT device 104. The regulated pressure may be manually input or, in some embodiments, scanned and/or imaged using the camera unit 145 from a display device on the calibration device 102 or elsewhere, wirelessly received from the remote server 122 or calibration device 102, and/or selected from a menu displayed on the display device 133 of the mobile device 107. The operator may then initiate the measurement of the regulated pressure by the EOT device 107 through the mobile device 107, which transmits a command to the EOT device 107, directly or via the remote server 122, or by manipulating an input device 132 on the EOT device as described above.

Once the EOT device 107 initiates the calibration certification process and measures the regulated pressure, it compares the regulated pressure to the measured pressure. The mobile device 107 may obtain the measured pressure in any number of ways such as, for example, from the EOT device 104 or the calibration device 102, directly or via the remote server 122, from the remote server 122, from operator input, or by any other means. After a determination is made whether the EOT device 104, has passed certification, the mobile device 107, through the display device 139, displays the certification result (e.g., "PASS" or "FAIL"). The mobile device 107, and more specifically the processor 141, may then generate pressure calibration certification data, including the certification result, and transmit it to the remote server 122. Further, in one non-limiting embodiment, the EOT device 104 may determine the certification result, as described above, and transmit it to the mobile device 107 or the remote server 122. In this embodiment, the mobile device 107 may be used to scan or image a display device 133 on the EOT device 104 to acquire the certification result.

In another preferred and non-limiting embodiment, and still referring to FIG. 2, the mobile device 107 may transmit a command to the remote server 122 to control the EOT device 104. For example, the mobile device 107 may acquire the identification of the EOT device 104 as described above and transmit the identification to the remote server 122 that includes the regulated pressure being applied to the EOT device 104. In response to this data, the remote server 122 may be configured to transmit a command to the EOT device 104 to initiate the calibration certification process. The EOT device 104 may then measure the regulated pressure and compare the measured pressure with the actual regulated pressure amount to determine the certification result.

Figure 3:
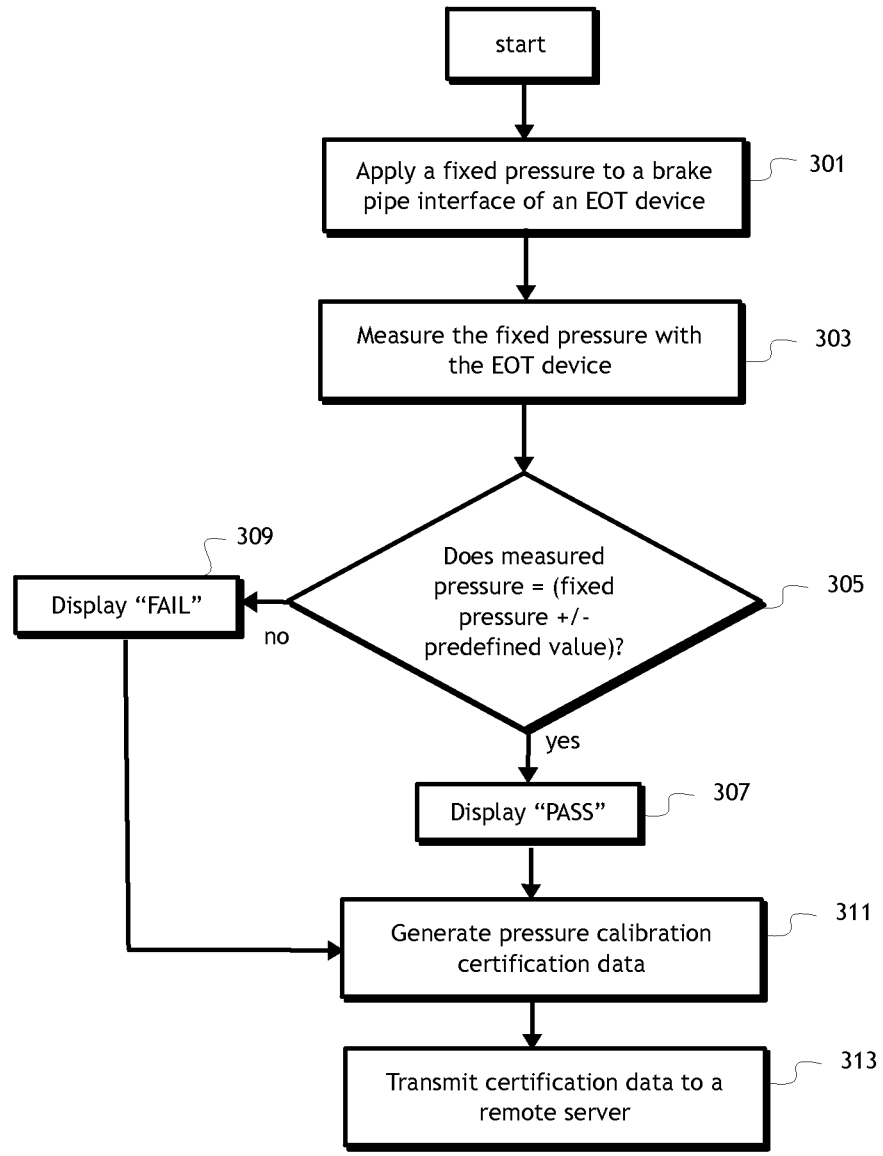
FIG. 3 illustrates a step-diagram for a system and method of a system for certifying a brake pressure calibration for an end-of-train device according to the principles of the present invention.

Referring now to FIG. 3, a method for certifying a brake pressure calibration is shown according to one preferred and non-limiting embodiment. Starting at step 301, a regulated or fixed pressure is applied to a brake pipe interface 130 of an EOT device 104. At a next step 303, the regulated or fixed pressure is measured with a pressure transducer 129 of the EOT device 104. At step 305, a determination is made whether the measured pressure is within a predefined range of the regulated or fixed pressure applied. As discussed herein, the determination may be performed by a controller 131 of the EOT device 104, by a mobile device 107, by a remote server 122, or by any other device that is provided with the regulated pressure and the measured pressure.

With continued reference to FIG. 3, if the measured pressure is within the predefined range, indicating that the variance between the two pressures is minor or insignificant, at step 307, a certification result indicating successful certification (e.g., "PASS") is displayed on the EOT device 104, the mobile device 107, or on any other display device. If the measured pressure is outside the predefined range, indicating that the variance between the two pressures is great enough to require calibration of the pressure transducer in the EOT device, at step 309 a certification resulting indicating an unsuccessful certification (e.g., "FAIL") is displayed on the EOT device 104, the mobile device 107, or on any other display device, at step 309. At step 311, pressure calibration certification data 101 is generated based at least partially on the certification result. At step 313, the generated pressure calibration certification data 101 is transmitted to a remote server 122.

Figure 4:
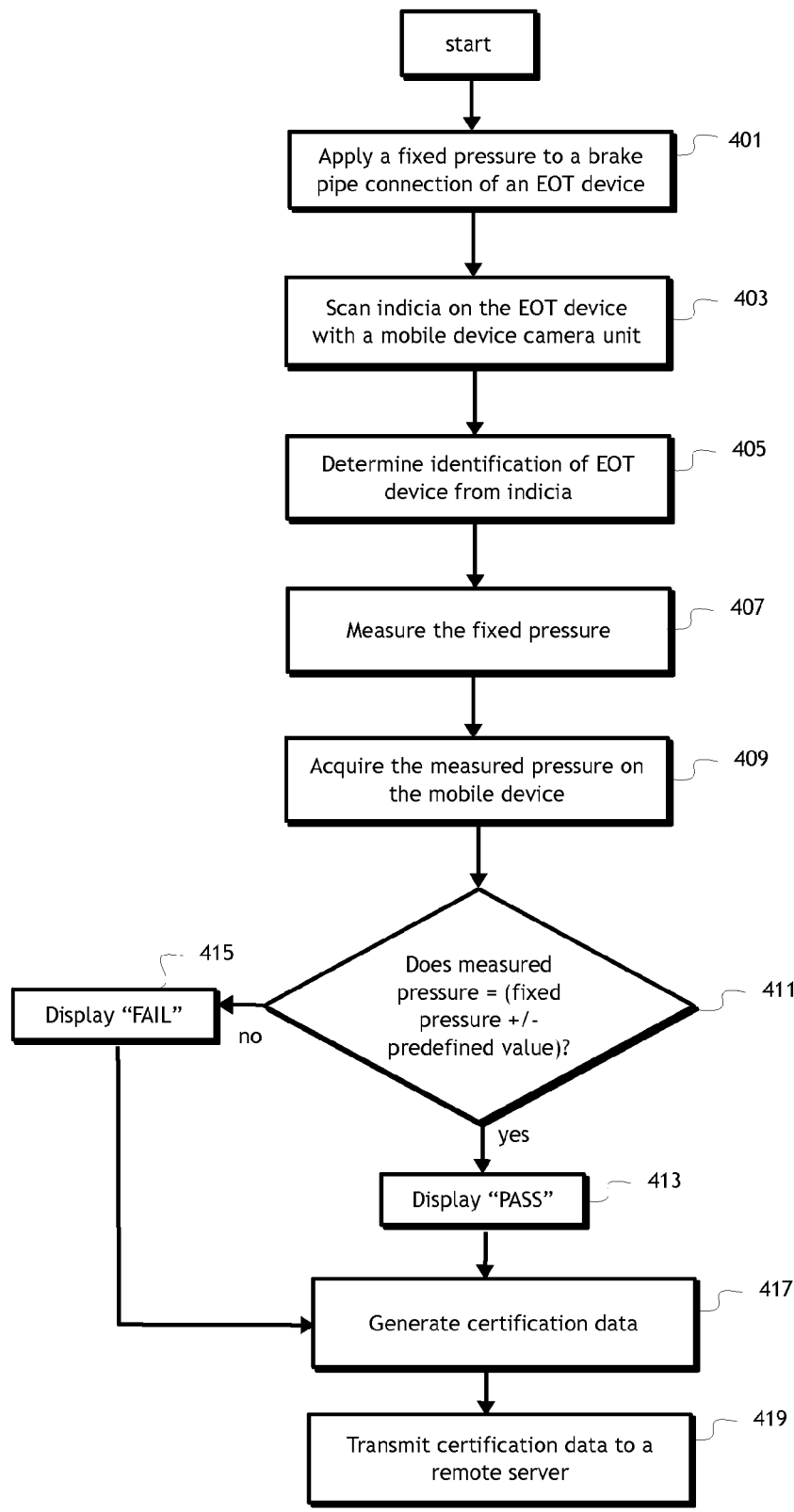
FIG. 4 illustrates a step-diagram for a system and method of a system for certifying a brake pressure calibration for an end-of-train device according to the principles of the present invention.

Referring now to FIG. 4, a method for certifying a brake pressure calibration is shown according to another preferred and non-limiting embodiment. At a first step 401, a regulated or fixed pressure is applied to a brake pipe interface 130 of an EOT device 104. At a next step 403, a mobile device 107 scans indicia 201 on the EOT device 104 to acquire identification information for the EOT device 104 and, at step 405, the identification information is determined or otherwise extracted from the indicia 201. The mobile device 107 may scan the indicia using an internal camera unit 145, as an example. It will be appreciated that the identification information may be acquired by the mobile device 107 with a barcode reader, manual input, communication with the EOT device 104, and/or the like. At a next step 407, the regulated pressure is measured by the EOT device 104. At step 409, the mobile device 107 acquires the measured pressure from the EOT device 104 or user input. The mobile device 107 may acquire the measured pressure by scanning a display device 133 on the EOT device 104 that indicates the measured pressure, by wireless or wired communication with the EOT device 104, by manual input, and/or the like.

With continued reference to FIG. 4, at step 411, a determination is made whether the measured pressure is within a predefined range of the regulated or fixed pressure applied to the EOT device 104. If the measured pressure is within the predefined range, the mobile device 107 displays an indication that the certification is successful (e.g., "PASS") at step 413. Likewise, if the measured pressure is outside the predefined range, the mobile device 107 displays an indication that the certification is unsuccessful (e.g., "FAIL") at step 415. With either result, the method proceeds to step 417 where pressure calibration certification data 101 is generated. At a final step 419, the pressure calibration certification data 101 is transmitted to a remote server 122.

In a preferred and non-limiting embodiment, and with reference to FIGS. 1 and 2, an alert may be generated by the back office system 108, a government entity, or a remote server 122 to indicate that a pressure calibration certification is due for a particular EOT device 104. For example, the EOT device 104 may receive an alert from the back office system 108 that causes the EOT device 104 to display, on the display device 133, a warning message or alert that the pressure calibration certification is due or expired. The warning message or alert may be displayed at any time, or may be displayed when the EOT device 104 is installed on a train or service bench. The warning message or alert may be generated automatically at predetermined intervals, or upon request of another party or entity. The certification database 109 may store analytical data that indicates, for various EOT devices 104, whether a particular EOT device 104 is past due for calibration, or is properly calibrated.

In a further preferred and non-limiting embodiment, existing EOT devices 104 may be provided with an external serial-to-Bluetooth adapter to allow for interaction with mobile devices 107. In this manner, a mobile device 107 may be used to receive the measured pressure and identification of the EOT device 104, as examples, determine the certification result, and transmit the certification result and/or pressure calibration certification data 101 to the remote server 122. It will be appreciated that various other wireless communication protocols may be used such as, for example, shared wireless networks, infrared signals, near-field communication, and/or the like.

In a preferred and non-limiting embodiment, and with reference to FIGS. 1 and 2, the remote server 122 may be configured to determine what EOT devices 104 require certification and/or calibration. For example, when an EOT device 104 is certified, the date and/or time of that certification may be stored in the certification database 109 and be used to determine or predict a date that a subsequent certification is due (e.g., at annual intervals). When the scheduled date for certification occurs, the remote server 122 may identify the location of the EOT device 104 and transmit an alert that an EOT device 104 is due for certification. The alert may be transmitted to, for example, the EOT device 104, an onboard locomotive computer, the calibration device 102, a mobile device 107, an email address, and/or the like. Further, the remote server 122 may determine that a particular EOT device 104 is due for certification and/or calibration at an earlier date based on the pressure calibration certification data 101. For example, if the pressure calibration certification data 101 indicates that the EOT device 104 has passed certification, but that the measured pressure was close to failing certification (e.g., 2 psi over or under if the certification threshold is 3 psi), the remote server 122 may send an alert earlier.

In non-limiting embodiments, the remote server 122 may analyze trends in the measured pressure amounts and variances to predict a time that the EOT device 104 should be calibrated. The trends may be analyzed using the drift amount of the pressure transducer 129 measurements. By analyzing a gradual degradation that results in a growing variance between measured pressure and actual pressure, an accurate prediction is possible of when the EOT device 104 will require calibration. It will be appreciated that such a prediction may also be at least partially based on temperature, atmospheric pressure, and other factors.

In a further preferred and non-limiting embodiment, the remote server 122 and/or back office system 108 may allow for governmental entities, such as the FRA, to inspect the certification database 109 and/or other instances of pressure calibration certification data 101. This allows the FRA or other entities to obtain calibration and/or certification evidence without requiring on-site inspection of an EOT device 104. Further, the pressure calibration certification data 101 may be transmitted directly to the FRA or other entities.

In non-limiting embodiments, a method to certify a brake pressure calibration for an end-of-train device may be performed by at least one non-transitory computer-readable medium including program instructions that, when executed by at least one processor, cause one or more devices to perform the steps. With the sole exception of transitory propagating signals, a non-transitory computer-readable medium may include any medium capable of storing data such as, but not limited to, random-access memory (RAM) and other forms of memory, hard drives, compact and floppy discs, and the like.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for certifying an end-of-train device pressure calibration, comprising:

applying a fixed pressure to a brake pipe interface of the end-of-train device with an automated calibration device while the end-of-train device is removed from a train;

measuring the fixed pressure with the end-of-train device to determine a measured pressure;

determining if the measured pressure is within a predetermined range of the fixed pressure;

generating pressure calibration certification data based at least partially on whether the measured pressure is within the predetermined range of the fixed pressure; and transmitting the pressure calibration certification data to at least one remote server.

2. The method of claim 1, wherein the automated calibration device transmits the pressure calibration certification data to the at least one remote server.

3. The method of claim 1, wherein the automated calibration device comprises at least one of the following: a display device, an adapter for a display device, a user input device, an adapter for a user input device, a Bluetooth adapter, a serial interface, or any combination thereof.

4. The method of claim 1, wherein the pressure calibration certification data comprises a pressure calibration certification result, and wherein the pressure calibration certification result indicates that the end-of-train device passed or failed certification.

5. The method of claim 4, wherein the pressure calibration certification data further comprises at least one of the following: an identifier of the end-of-train device, a date, a location, the measured pressure, the fixed pressure, or any combination thereof.

6. The method of claim 1, wherein the end-of-train device comprises machine-readable indicia or device comprising data identifying the end-of-train device, and wherein the end-of-train device comprises at least one display, the method further comprising:

scanning the machine-readable indicia or device with a mobile device; and scanning the at least one display with the mobile device after the end-of-train device has measured the fixed pressure and displays the measured pressure on the at least one display.

7. The method of claim 6, wherein the mobile device determines if the measured pressure is within the predetermined range, wherein the pressure calibration certification data is generated by the mobile device, and wherein the mobile device transmits the pressure calibration certification data to the at least one remote server.

8. The method of claim 6, further comprising inputting, into the mobile device, a value representing the fixed pressure.

9. The method of claim 1, further comprising transmitting, from a mobile device to the at least one remote server, data configured to cause the at least one remote server to transmit, to the end-of-train device, data configured to cause the end-of-train device to enter a certification mode.

10. The method of claim 9, further comprising receiving, on the mobile device, the fixed pressure amount from a source of the fixed pressure.

11. The method of claim 1, further comprising receiving, from the at least one remote server, data configured to display a warning message or alert on the end-of-train device when a calibration certification is due or expired.

12. A computer program product for certifying an end-of-train device pressure calibration on a mobile device including at least one processor, the computer program product comprising at least one non-transitory computer-readable medium including program instructions that, when executed by the at least one processor, cause the mobile device to:

determine or receive an identification of the end-of-train device at least partially based on scanning at least one machine-readable indicia or device comprising identification data;

determine or receive a pressure calibration certification result based at least partially on a fixed pressure applied to the end-of-train device and a measurement of the fixed pressure by the end-of-train device; and transmit, to at least one remote server, the identification of the end-of-train device and the pressure calibration certification result.

13. The computer program product of claim 12, wherein the program instructions, when executed by the at least one processor, further cause the mobile device to:

acquire the fixed pressure applied to the end-of-train device; and acquire, from the end-of-train device, the measurement of the fixed pressure.

14. The computer program product of claim 12, wherein the program instructions, when executed by the at least one processor, further cause the mobile device to:

capture at least one image of at least one display on the end-of-train device by a camera unit of the mobile device; and acquire at least one of the fixed pressure amount and the measurement by processing the at least one image of at least one display on the end-of-train device.

15. The computer program product of claim 12, wherein the program instructions, when executed by the at least one processor, further cause the mobile device to: acquire the fixed pressure amount from a pressure calibration device that outputs the fixed pressure.

16. The computer program product of claim 12, wherein the program instructions, when executed by the at least one processor, further cause the mobile device to transmit, to the at least one remote server or the end-of-train device, data configured to cause the end-of-train device to initiate the measurement of the fixed pressure.

17. The computer program product of claim 12, wherein the program instructions, when executed by the at least one processor, further cause the mobile device to: wirelessly communicate with at least one of the end-of-train device and a pressure calibration device that outputs the fixed pressure.

18. The computer program product of claim 12, wherein the program instructions, when executed by the at least one processor, further cause the mobile device to: receive the pressure calibration certification from at least one of the end-of-train device and a pressure calibration device that outputs the fixed pressure.

19. A system for certifying an end-of-train device pressure calibration, comprising:

(a) a pressure calibration device configured to output a regulated pressure;

(b) an end-of-train device comprising:

(i) a brake pipe interface adapted to receive the regulated pressure from the pressure calibration device;

(ii) a pressure sensing device configured to obtain a measured pressure by measuring the regulated pressure; and (iii) at least one machine-readable indicia or device, the at least one machine-readable indicia or device comprising identification data for the end-of-train device; and (c) at least one mobile device configured to read or scan the at least one machine-readable indicia or device to determine the identification data, wherein at least one of the pressure calibration device and the end-of-train device comprises at least one controller configured to determine a calibration certification result based at least partially on a difference between the measured pressure and the regulated pressure.

\* \* \* \* \*